(12) United States Patent
Wang

(10) Patent No.: US 8,927,908 B2
(45) Date of Patent: Jan. 6, 2015

(54) TEMPERATURE CONTROL CIRCUIT FOR TWO HEATING DEVICES

(75) Inventor: Ching-Chuan Wang, Keelung (TW)

(73) Assignee: Multi-Technology Health Care Inc., New Taipei (TW)

( * ) Notice: Subject to any disclaimer, the term of this patent is extended or adjusted under 35 U.S.C. 154(b) by 350 days.

(21) Appl. No.: 13/440,486

(22) Filed: Apr. 5, 2012

(65) Prior Publication Data

US 2013/0264329 A1    Oct. 10, 2013

(51) Int. Cl.
   *H05B 1/02*    (2006.01)

(52) U.S. Cl.
   USPC ............................ 219/483; 219/477; 219/505

(58) Field of Classification Search
   CPC ... G05D 23/20; G05D 23/24; G05D 23/2422; H05B 1/0272
   USPC ........................... 219/504, 505, 212, 477, 483
   See application file for complete search history.

(56) References Cited

U.S. PATENT DOCUMENTS

| | | | | |
|---|---|---|---|---|
| 3,597,590 A * | 8/1971 | Fleming | ........................ | 219/501 |
| 3,651,308 A * | 3/1972 | Kurokawa et al. | ............ | 219/505 |
| 3,854,033 A * | 12/1974 | Edge | ............... | 219/483 |
| 4,031,352 A * | 6/1977 | Oosterberg | .................... | 219/212 |
| 4,198,562 A * | 4/1980 | Mills et al. | ..................... | 219/505 |
| 4,302,663 A * | 11/1981 | Chesnut et al. | ................ | 219/497 |
| 5,428,206 A * | 6/1995 | Uchida et al. | .................. | 219/505 |
| 5,861,610 A | 1/1999 | Weiss | | |
| 6,222,162 B1 * | 4/2001 | Keane | ........................... | 219/481 |
| 6,300,597 B1 | 10/2001 | Lee | | |
| 6,310,322 B1 | 10/2001 | Yang et al. | | |
| 6,310,332 B1 * | 10/2001 | Gerrard | ......................... | 219/505 |
| 6,689,989 B2 * | 2/2004 | Irwin et al. | .................... | 219/212 |
| 6,768,086 B2 | 7/2004 | Sullivan et al. | | |
| 7,180,037 B2 * | 2/2007 | Weiss | ............................ | 219/505 |
| 7,485,832 B2 * | 2/2009 | Wang | ............................ | 219/482 |
| 2007/0257017 A1 * | 11/2007 | Deangelis et al. | ............ | 219/211 |

* cited by examiner

*Primary Examiner* — Henry Yuen
*Assistant Examiner* — John J Norton
(74) *Attorney, Agent, or Firm* — Muncy, Geissler, Olds & Lowe, P.C.

(57) ABSTRACT

A temperature control circuit for two heating devices respectively provided with a heater and a sensing wire. The sensing wires' ends are respectively connected to a diode. The two diodes' polarity is opposite to that of the sensing wires' connecting ends. Another ends of the sensing wires are connected to a capacitor to form a resistor-capacitor circuit. The heater wires are connected to a diode respectively and then a bi-directional thyristor. The two diodes' polarity is opposite to that of the heater wires' connecting ends. Thereby, the heater wires can be heated up respectively by the positive and negative half-periods of alternating current. When phase shifts occur because of the heater wires' temperature change, the sensing wires can control the bi-directional thyristor via a controller so that the positive or negative half-period are not triggered. Therefore, the heater wires' heating temperatures can be controlled individually.

8 Claims, 3 Drawing Sheets

TEMPERATURE CONTROL CIRCUIT FOR TWO HEATING DEVICES

BACKGROUND OF THE INVENTION

1. Field of Invention

The present invention relates to a temperature control circuit and more particularly to a temperature control circuit which can respectively control two heating devices, such as electric blankets and hot packs, by using simple elements.

2. Related Art

Heating devices such as hot packs are very popular in the market. The heating of a heater wire is interrupted automatically after it is heated up to a temperature preset by the user to ensure safety, so that the heating temperature of the heating device can be maintained within a preset range so that the heating device can be used as a hot compress and its safety can be ensured.

In order to control the temperature effectively, U.S. Pat. No. 5,861,610 employs a positive temperature coefficient (PTC) element as the sensing wire to sense the changes in temperature, and a heater wire for heating up and temperature control. These techniques have already been disclosed in U.S. Pat. Nos. 6,300,597, 6,310,322 and 6,768,086.

U.S. Pat. No. 7,180,037 discloses an invention employing a positive temperature coefficient (PTC) element or a negative temperature coefficient (NTC) element, and the main differences between it and the above-mentioned conventional techniques lie in that: U.S. Pat. No. 7,180,037 senses the zero cross signal generated by the response of zero crossing of AC power signals, and senses the zero cross signal generated by the response of zero crossing of phase-shift AC power signals generated by the change of resistance caused by the change of temperature by the positive temperature coefficient (PTC) element or the negative temperature coefficient (NTC) element. By measuring the phase-shift time of the two zero cross signals and until that the phase-shift time is increased to reach the phase-shift time preset by a controller, a control signal is output by the controller to render the circuit connected or interrupted. As a result, both heating up and temperature control are achieved.

The above-mentioned temperature control methods can achieve the effect of controlling temperature. Nevertheless, the above-mentioned temperature control methods can only heat up the heater wire of one heating device. The below problems will occur when the heater wires of two heating devices are heated up respectively:

1. The manufacturing cost is increased because the heating up of the two heater wires requires two sets of temperature control circuits.

2. If one switch is used for controlling the two heater wires, the two heater wires can only be heating up at the same time or stopped heating up at the same time. The heater wire of each of the two heating devices cannot be controlled separately.

3. When one switch is used for controlling the two heater wires and the two heating devices are placed at different locations, different temperatures will be sensed by two sensing wires and the controller will use a highest temperature for temperature control. Therefore, when one of the heater wires has reached a preset temperature and is stopped being heated up continuously; the heating up of the other heater wire, which has not reached a preset temperature, is also interrupted. As a result, the hot compress function of the two heating devices can not be used at the same time which is inconvenient for using.

In view of the above problems, a temperature control circuit of the present invention is disclosed to control two heating devices separately and can also save the manufacturing cost.

SUMMARY OF THE INVENTION

An object of the present invention is to provide a temperature control circuit for two heating devices. Two heater wires of the two heating devices can be heated up respectively by the positive half-period and negative half-period of alternating current. Sensing wires are used to sense the heating temperatures of the two heater wires respectively. When the heating temperatures of the two heater wires have reached preset temperatures, a controller is used to interrupt the heating up of the heater wires individually. Therefore, the hot compress effect of the two heating devices can be achieved, and two of the heating devices can be used at the same time or separately.

Another object of the present invention is to provide a temperature control circuit for two heating devices. By employing a disposition of a bi-directional thyristor and a plurality of diodes to control the heating wires of the two heating devices. Thereby, the elements are simplified and the manufacturing cost can be saved.

In order to achieve the above-mentioned objects, the present invention provides a temperature control circuit for two heating devices which comprise a first heating device and a second heating device. A first heater wire and a first sensing wire are disposed in the first heating device; a second heater wire and a second sensing wire are disposed in the second heating device. The first heater wire and the second heater wire are connected in parallel; the first sensing wire and the second sensing wire are connected in parallel. First ends of the first heater wire and the second heater wire as well as first ends of the first sensing wire and the second sensing wire are connected with a polarity of an alternating current power source. A temperature control circuit of the two heating devices comprises a bi-directional thyristor (TRIAC), a controller, a capacitor and four diodes. A first end of the bi-directional thyristor is connected to second ends of the first heater wire and the second heater wire. A second end of the bi-directional thyristor is connected to another polarity of the alternating current power source. The controller is connected with second ends of the first sensing wire and the second sensing wire. A first node is disposed between the controller and the second ends of the first sensing wire and the second sensing wire. The controller comprises a trigger circuit and the trigger circuit is connected with a gate of the bi-directional thyristor so that a controller switch can conduct the alternating current in two half-waves or one half-wave. The capacitor is coupled with the first node. A first end of the first diode is connected with the first end of the first sensing wire; a first end of the second diode is connected with the first end of the second sensing wire. The polarity of the first end of the second diode is different from that of the first end of the first diode. A second end of the third diode is connected with the second end of the first heater wire; a second end of the fourth diode is connected with the second end of the second heater wire. The polarity of the second end of the fourth diode is different from that of the second end of the third diode.

In implementation, the first sensing wire is a positive temperature coefficient (PTC) element or a negative temperature coefficient (NTC) element.

In implementation, a second node, a third node and a fourth node are disposed between the first end of the second heater wire and the polarity of the alternating current power source. The second end of the first diode is coupled with the second node; the first end of the first heater wire is coupled with the third node; and the second end of the second diode is coupled with the fourth node. A sixth node is disposed between the second end of the second sensing wire and the first node, and the second end of the first sensing wire is coupled with the sixth node.

In implementation, a fifth node is disposed between the fourth diode and the switch, and the first end of the third diode is coupled with the fifth node.

The present invention will become more fully understood by reference to the following detailed description thereof when read in conjunction with the attached drawings.

DETAILED DESCRIPTION OF THE INVENTION

Figure 1:
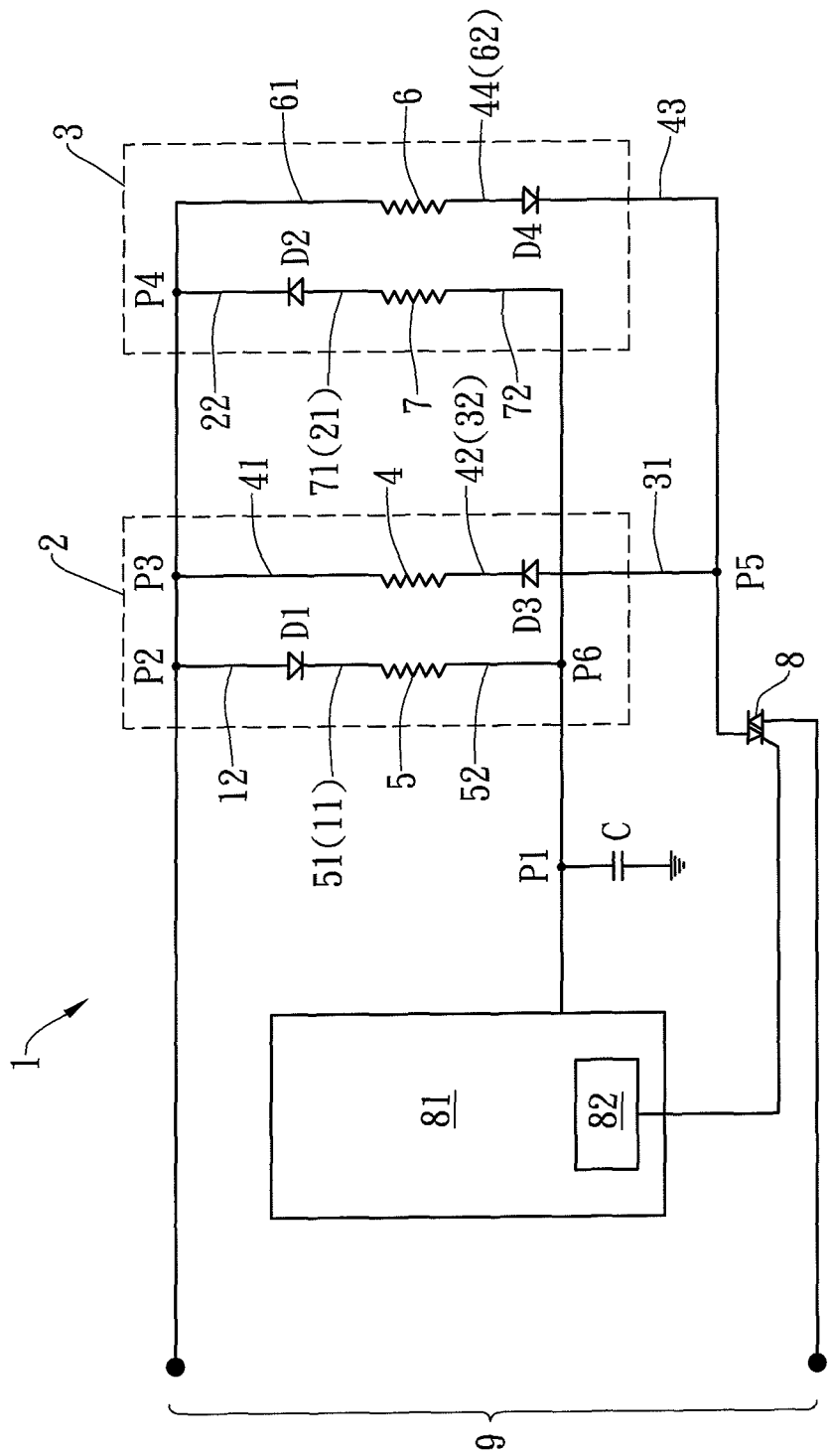
FIG. 1 is a circuit diagram of a temperature control circuit for two heating devices according to a preferred embodiment of the present invention.

FIG. 1 is a preferred embodiment of the present invention of a temperature control circuit 1 for two heating devices. The two heating devices comprise a first heating device 2 and a second heating device 3. The first heating device 2 and the second heating device 3 are preferably two hot packs connected with each other. A first heater wire 4 and a first sensing wire 5 connected in parallel are disposed in the first heating device 2; a second heater wire 6 and a second sensing wire 7 connected in parallel are disposed in the second heating device 3. The first heater wire 4 and the second heater wire 6 are connected in a heating circuit in parallel; the first sensing wire 5 and the second sensing wire 7 are connected in a heating circuit in parallel. The first sensing wire 5 and the second sensing wire 7 are positive temperature coefficient (PTC) conducting wires; the first sensing wire 5 and the second sensing wire 7 can also be negative temperature coefficient (NTC) conducting wires. Thereby, the resistances can be relatively larger or smaller when they are heated up to cause the temperatures to increase. A first end 61 of the second heater wire 6 is connected with a polarity of an alternating current power source 9. A second node P2, a third node P3 and a fourth node P4 are sequentially disposed between the first end 61 of the second heater wire 6 and the polarity of the alternating current power source 9.

The temperature control circuit 1 comprises a first diode D1, a second diode D2, a third diode D3, a fourth diode D4, a bi-directional thyristor (TRIAC) 8, a controller 81 and a capacitor C.

A second end 12 of the first diode D1 is a positive pole and the second end 12 is coupled with the second node P2. A first end 11 of the first diode D1 is a negative pole and the first end 11 is connected with a first end 51 of the first sensing wire 5. A second end 22 of the second diode D2 is a negative pole and the second end 22 is coupled with the fourth node P4. A first end 21 of the second diode D2 is a positive pole and the first end 21 is connected with a first end 71 of the second sensing wire 7. A second end 44 of the fourth diode D4 is a positive pole and the second end 44 is connected with a second end 62 of the second heater wire 6. A first end 43 of the fourth diode D4 is a negative pole and the first end 43 is connected with a first positive polar end of the bi-directional thyristor 8. A fifth node PS is disposed between the first end 43 of the fourth diode D4 and the first positive polar end of the bi-directional thyristor 8. A second positive polar end of the bi-directional thyristor 8 is connected with another polarity of the alternating current power source 9. A first end 41 of the first heater wire 4 is coupled with the third node P3. A second end 42 of the first heater wire 4 is connected with a second end 32 of the third diode D3. The second end 32 is a negative pole and a first end 31 of the third diode D3 is a positive pole. The first end 31 is coupled with the fifth node PS.

The controller 81 is connected with a second end 72 of the second sensing wire 7. A sixth node P6 and a first node P1 are disposed between the controller 81 and the second end 72 of the second sensing wire 7. A second end 52 of the first sensing wire 5 is coupled with the sixth node P6 and the capacitor C is coupled with the first node P1 so that the capacitor C as well as the first sensing wire 5 and the second sensing wire 7 form a resistor-capacitor (RC) circuit. The controller 81 comprises a trigger circuit 82 and the trigger circuit 82 is connected with the gate of the bi-directional thyristor 8.

Figure 2:
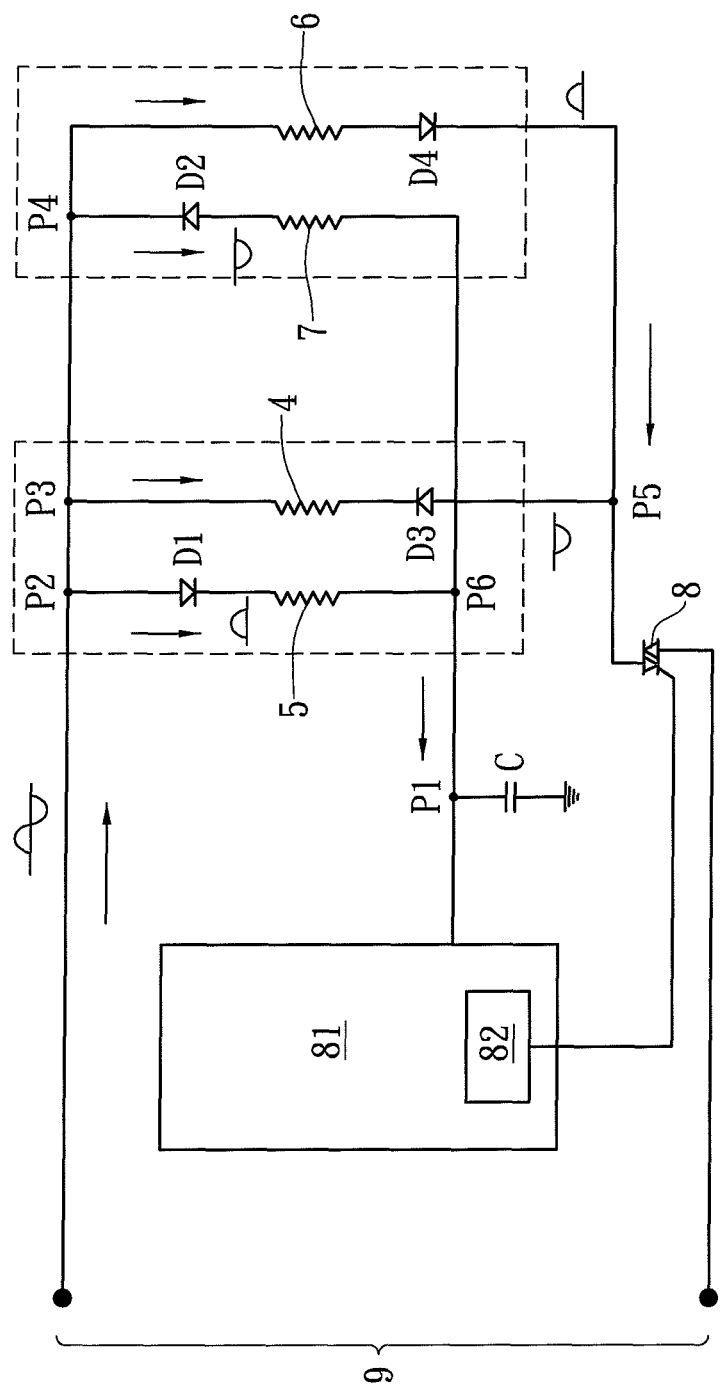
FIG. 2 is a circuit diagram of the conducted temperature control circuit for the two heating devices according to a preferred embodiment of the present invention.

Thereby, as shown in FIG. 2, under a normal heating, the controller 81 sends a signal in a certain interval to control the trigger circuit 82 and the trigger circuit 82 triggers the bi-directional thyristor 8 intermittently. Therefore, the alternating current passes the first diode D1 and the second diode D2 in two half-waves. Because of the reverse disposition of the first diode D1 and the second diode D2 as well as the reverse disposition of the third diode D3 and the fourth diode D4, the positive half-period of the alternating current passes the first sensing wire 5 and the second heater wire 6, and the negative half-period of the alternating current passes the first heater wire 4 and the second sensing wire 7 in order to heat up the first heater wire 4 and the second heater wire 6.

Figure 3:
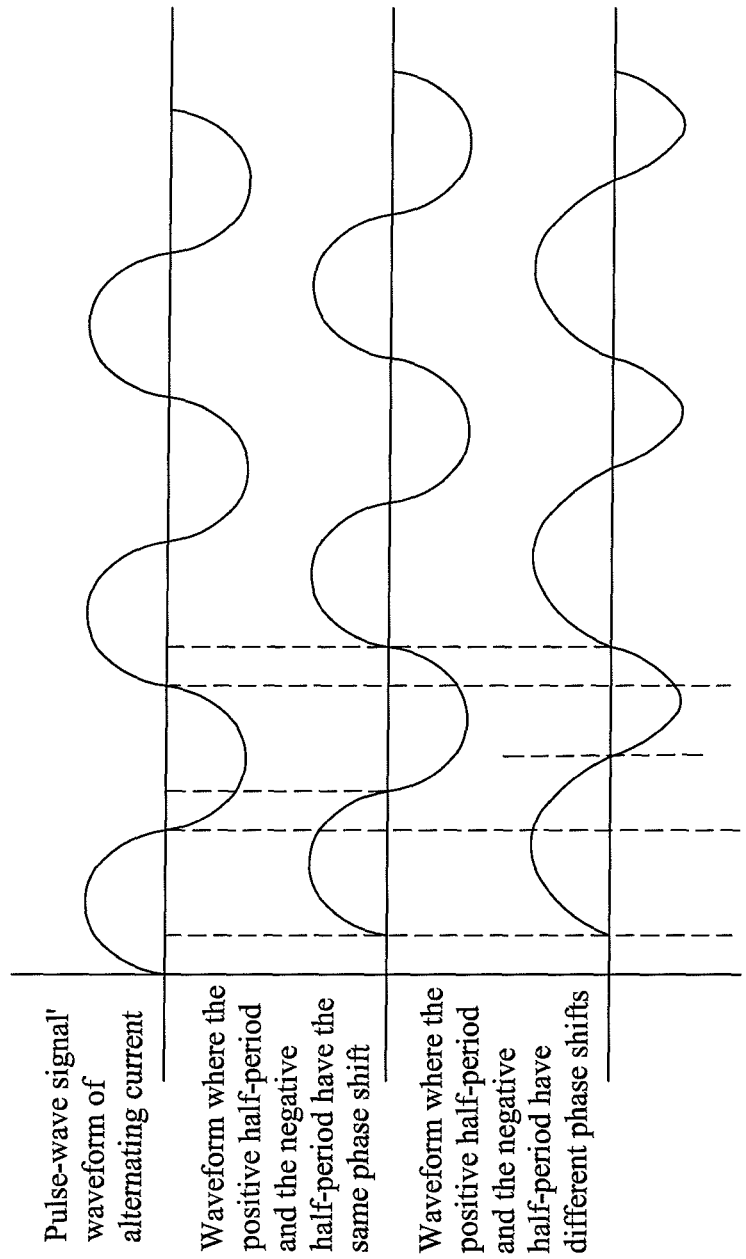
FIG. 3 is an illustration of different phase shifts of the positive half-period and negative half-period of the temperature control circuit for the two heating devices of the present invention.

When the temperatures of the first heater wire 4 and the second heater wire 6 increase, the temperatures of the first sensing wire 5 and the second sensing wire 7 increase. Because the first sensing wire 5 and the second sensing wire 7 as well as the capacitor C form the resistor-capacitor (RC) circuit, phase shifts are formed as shown in FIG. 3. When the temperatures of the first sensing wire 5 and the second sensing wire 7 are the same, the phase shift of the positive half-period and the negative half-period are the same. When the temperatures of the first sensing wire 5 and the second sensing wire 7 are different, the phase shift of the positive half-period and the negative half-period are different. Because the phase shift of the positive half-period and the negative half-period are different, the temperatures of the first heater wire 4 and the second heater wire 6 can be known.

When the temperature of the first heater wire 4 increases and based on the phase shift detected at the first node P1 which has reached a preset value, the controller 81 will control the bi-directional thyristor 8 to limit it from triggering negative half-period in order to stop the first heater wire 4 being heated up. When the temperature of the second heater wire 6 increases and based on the phase shift detected at the first node P1 which has reached a preset value, the controller 81 will control the bi-directional thyristor 8 to limit it from triggering positive half-period in order stop the second heater wire 6 being heated up.

Therefore, the present invention has the following advantages:

1. The present invention can control the positive half-period and the negative half-period of the alternating current to be conducted or interrupted in order to control the heating temperatures of the two heater wires. Therefore, the two heating devices can be used by the user at the same time or separately according to the need which provides flexibility in usage.

2. The present invention uses one bi-directional thyristor to control the heating temperatures of the heater wires of the two heating devices individually. Therefore the elements are simplified and the manufacturing cost can be saved.

As a conclusion from the above disclosure, the objectives of the present invention can be achieved. The temperature control circuit for the two heating devices of the present invention not only can control the two heating devices individually for the convenience of usage, the elements are simplified and the manufacturing cost can be saved as well.

Although the embodiments of the present invention have been described in detail, many modifications and variations may be made by those skilled in the art from the teachings disclosed hereinabove. Therefore, it should be understood that any modification and variation equivalent to the spirit of the present invention be regarded to fall into the scope defined by the appended claims.

What is claimed is:

1. A temperature control circuit for two heating devices; wherein the two heating devices include a first heating device and a second heating device; a first heater wire and a first sensing wire are disposed in the first heating device, and a second heater wire and a second sensing wire are disposed in the second heating device; the first heater wire and the second heater wire are connected in parallel, and the first sensing wire and the second sensing wire are connected in parallel;

the temperature control circuit for said two heating devices comprising:

a first diode, a first end of the first diode being connected with a first end of the first sensing wire;

a second diode, a first end of the second diode being connected with a first end of the second sensing wire the s polarity of the first end of the second diode being opposite to that of the first end of the first diode, wherein first ends of the first heater wire and the second heater wire and second ends of the first diode and the second diode are connected with a polarity of an alternating current power source;

a third diode, a second end of the third diode being connected with a second end of the first heater wire;

a fourth diode, a second end of the fourth diode being connected with a second end of the second heater wire, the polarity of the second end of the fourth diode being opposite to that of the second end of the third diode;

a bi-directional thyristor, a first end of the bi-directional thyristor being connected with first ends of the third diode and the fourth diode, and a second end of the bi-directional thyristor being connected with another polarity of the alternating current power source;

a controller connected with second ends of the first sensing wire and the second sensing wire; a first node being disposed between the controller and the second ends of the first sensing wire and the second sensing wire; the including a trigger circuit and the trigger circuit being connected with a gate of the bi-directional thyristor so that a controller switch can conduct the alternating current in a way of two half-waves or one half-wave; and a capacitor coupled with the first node;

wherein said first sensing wire is a positive temperature coefficient (PTC) element or a negative temperature coefficient (NTC) element; and said second sensing wire is a positive temperature coefficient element or a negative temperature coefficient element.

2. The temperature control circuit for the two heating devices as claimed in claim 1, wherein a second node, a third node and a fourth node are disposed between the first end of the second heater wire and one polarity of the alternating current power source, the second end of the first diode is coupled with the second node, the first end of the first heater wire is coupled with the third node, the second end of the second diode is coupled with the fourth node, a sixth node is disposed between the second end of the second sensing wire and the first node, the second end of the first sensing wire is coupled with the sixth node.

3. The temperature control circuit for the two heating devices as claimed in claim 2, wherein a fifth node is disposed between the fourth diode and the switch, the first end of the third diode is coupled with the fifth node.

4. The temperature control circuit for the two heating devices as claimed in claim 1, wherein the first end of the first diode is a positive pole, the first end of the second diode is a negative pole, the second end of the third diode is a positive pole and the second end of the fourth diode is a negative pole.

5. The temperature control circuit for the two heating devices as claimed in claim 4, wherein a second node, a third node and a fourth node are disposed between the first end of the second heater wire and one polarity of the alternating current power source, the second end of the first diode is coupled with the second node, the first end of the first heater wire is coupled with the third node, the second end of the second diode is coupled with the fourth node, a sixth node is disposed between the second end of the second sensing wire and the first node, the second end of the first sensing wire is coupled with the sixth node.

6. The temperature control circuit for the two heating devices as claimed in claim 5, wherein a fifth node is disposed between the fourth diode and the switch, the first end of the third diode is coupled with the fifth node.

7. The temperature control circuit for the two heating devices as claimed in claim 1, wherein a second node, a third node and a fourth node are disposed between the first end of the second heater wire and one polarity of the alternating current power source, the second end of the first diode is coupled with the second node, the first end of the first heater wire is coupled with the third node, the second end of the second diode is coupled with the fourth node, a sixth node is disposed between the second end of the second sensing wire and the first node, the second end of the first sensing wire is coupled with the sixth node.

8. The temperature control circuit for the two heating devices as claimed in claim 7, wherein a fifth node is disposed between the fourth diode and the switch, the first end of the third diode is coupled with the fifth node.

* * * * *